United States Patent [19]

DiSanto et al.

[11] Patent Number: 5,041,824
[45] Date of Patent: Aug. 20, 1991

[54] SEMITRANSPARENT ELECTROPHORETIC INFORMATION DISPLAYS (EPID) EMPLOYING MESH LIKE ELECTRODES

[75] Inventors: Frank J. DiSanto, North Hills; Denis A. Krusos, Lloyd Harbor, both of N.Y.

[73] Assignee: Copytele, Inc., Huntington Station, N.Y.

[21] Appl. No.: 318,751

[22] Filed: Mar. 2, 1989

[51] Int. Cl.$^5$ ............................................. G09G 3/34
[52] U.S. Cl. .................................... 340/787; 359/296
[58] Field of Search ............... 340/787; 350/362, 334, 350/338, 336

[56] References Cited

U.S. PATENT DOCUMENTS

| | | | |
|---|---|---|---|
| 4,071,430 | 1/1978 | Liebert | 350/362 |
| 4,196,973 | 4/1980 | Hochstrate | 350/338 |
| 4,522,472 | 6/1985 | Liebert et al. | 350/362 |
| 4,746,917 | 5/1988 | Di Santo et al. | 350/362 |
| 4,833,464 | 5/1989 | DiSanto et al. | 340/793 |

Primary Examiner—Alvin E. Oberley
Assistant Examiner—Xiao Min Wu
Attorney, Agent, or Firm—Arthur L. Plevy

[57] ABSTRACT

An electrophoretic display includes a plurality of intersecting grid and cathode lines which are spaced one from the other by means of an insulating material. The grid and cathode lines are associated with an anode electrode which constitutes a planar glass plate having deposited thereon a thin layer of ITO or a similar metal. Interposed between the cathode and grid structure and the anode plate is a mesh electrode which is relatively of the same size as the anode plate. Control voltages are applied to the mesh structure and the anode electrode to further control particle propagation. The conventional anode structure may be entirely replaced with the mesh-like structure to provide an electrophoretic display which can be optimumly illuminated by back lighting.

20 Claims, 2 Drawing Sheets

SEMITRANSPARENT ELECTROPHORETIC INFORMATION DISPLAYS (EPID) EMPLOYING MESH LIKE ELECTRODES

BACKGROUND OF THE INVENTION

This invention relates to electrophoretic information displays (EPID) in general and more particularly to an EPID display employing a mesh like electrode.

The prior art is replete with a number of various patents and articles concerning electrophoretic displays. Such electrophoretic displays have been widely described and disclosed in the prior art, and essentially the assignee herein, namely—Copytele, Inc. of Huntington Station, N.Y., has recently developed an electrophoretic display which has an image area of approximately $11 \times 8\frac{1}{2}$ inches and is designed to be used either as a separate display or to be combined with other displays. The company has the ability to combine as many as four such displays to create image areas as large as approximately $22 \times 17$ inches.

The information on such displays can be changed either locally or remotely and can be viewed at an angle of nearly 180°. Such displays have extremely high resolution and can accommodate over 160,000 pixels within an image area of approximately 2.8 inches diagonally. In regard to such displays, reference is made to U.S. Pat. No. 4,655,897 issued on Apr. 7, 1987 entitled ELECTROPHORETIC DISPLAY PANELS AND ASSOCIATED METHODS to Frank J. DiSanto and Denis A. Krusos and assigned to Copytele, Inc., the assignee herein.

In that patent there is described an electrophoretic display panel which includes a planar transparent member having disposed on a surface a plurality of vertical conductive lines to form a grid of lines in the Y direction. On top of the grid of vertical lines there is disposed a plurality of horizontal lines which are positioned above the vertical lines and insulated therefrom by a thin insulating layer at each of the intersection points. Spaced above the horizontal and vertical line pattern is a conductive plate. The space between the conductive plate and the X and Y line pattern is filled with an electrophoretic dispersion containing chargeable pigment particles.

When a voltage is impressed on the X and Y lines, pigment particles which are located in wells or depressions between the X and Y pattern are caused to migrate towards the conductive plate and are deposited on the plate in accordance with the bias supplied to the X and Y conductors.

There is described in that patent an electrophoretic dispersion suitable for operation with the display as well as techniques for fabricating the display. Hence, in this manner the displays can be fabricated to contain large effective display surfaces while being relatively thin and which are capable of high resolution and relatively low power. As indicated, the above-noted patent and others include information concerning the fabrication, operation and resolution of such displays.

See also U.S. Pat. No. 4,772,820 entitled "Monolithic Flat Panel Display Apparatus" issued on Sept. 20, 1988 to Frank J. DiSanto et al. and assigned to the assignee herein. This patent shows an electrophoretic display as well as methods for fabrication and operating such a display.

See also U.S. Pat. No. 4,742,345 entitled "Electrophoretic Display Panel Apparatus And Methods Therefor" by Frank J. DiSanto et al. and assigned to the assignee herein. This patent shows such a display having improved alignment and contrast characteristics and structure and methods for aligning and operating such a display.

See also U.S. Pat. No. 4,746,917 entitled "Methods And Apparatus For Operating An Electrophoretic Display Between A Display And A Non-Display Mode" issued on May 24, 1988 to Frank J. DiSanto et al. and assigned to the assignee herein. This patent shows and describes a power supply circuit for operating such a display between a display and a non-display mode.

As one can ascertain from the prior art, the electrophoretic display has been thoroughly investigated and essentially it is a continuing object to provide more reliable operation as well as to provide displays which permit greater control of the image producing pigment particles as propagating within the display.

The electrophoretic effect is associated with working fluids which includes a dispersion of electrophoretic particles. These particles may be fabricated from an opaque dielectric material or a pigment which particles are suspended in a colored non-conducting suspension medium. The particles preferably are uniformly distributed throughout the suspension medium and the contrast between the particles and the suspension medium is the mechanism which enables one to formulate an image.

When the composite material is subjected to an electric field, the particles are caused to move electrophoretically in the direction of either the cathode or the anode. These particles are deposited upon the respective structure to cause that structure to assume the color of the particle which, for example, may be grey, white or some other color depending upon the pigment utilized. Hence, as one can ascertain, by selectively moving the particles one can produce images based on the migration and orientation of the particles with respect to a charged surface. As indicated, this effect is well known as for example ascertained by the above-noted prior art and many of the references cited against such prior art.

As one will immediately understand, it is a major object in all such displays to produce a reliable display as well as to provide a uniform and rapid movement of the particles. In prior art displays, extreme difficulty was experienced when attempting to move the particles at high speeds and to further control the particles so that a uniform image is displayed. It was a further difficulty to utilize lighting as back lighting with such a display due to the fact that the anode electrode, which is a planar electrode, is not totally transparent but essentially is semi-transparent and hence any attempts to back light the displays of the prior art were difficult to accommodate.

It is an object of the present invention to provide a mesh electrode which mesh electrode provides greater control of the pigment particles and therefore provides a display which is more reliable and easier controlled than those of the prior art.

It is a further object to provide an electrophoretic display having a mesh electrode to enable back lighting of the display and hence overcoming many of the prior art problems.

SUMMARY OF THE INVENTION

In an electrophoretic display of the type having an XY matrix assembly consisting of a grid of vertical lines intersected by a grid of horizontal lines and insulated therefrom, with an anode electrode spaced from said matrix assembly and with an electrophoretic dispersion located between said anode and matrix assembly, the improvement therewith of a mesh like electrode structure located between said matrix assembly and said anode electrode.

DETAILED DESCRIPTION OF THE FIGURES

Figure 1:
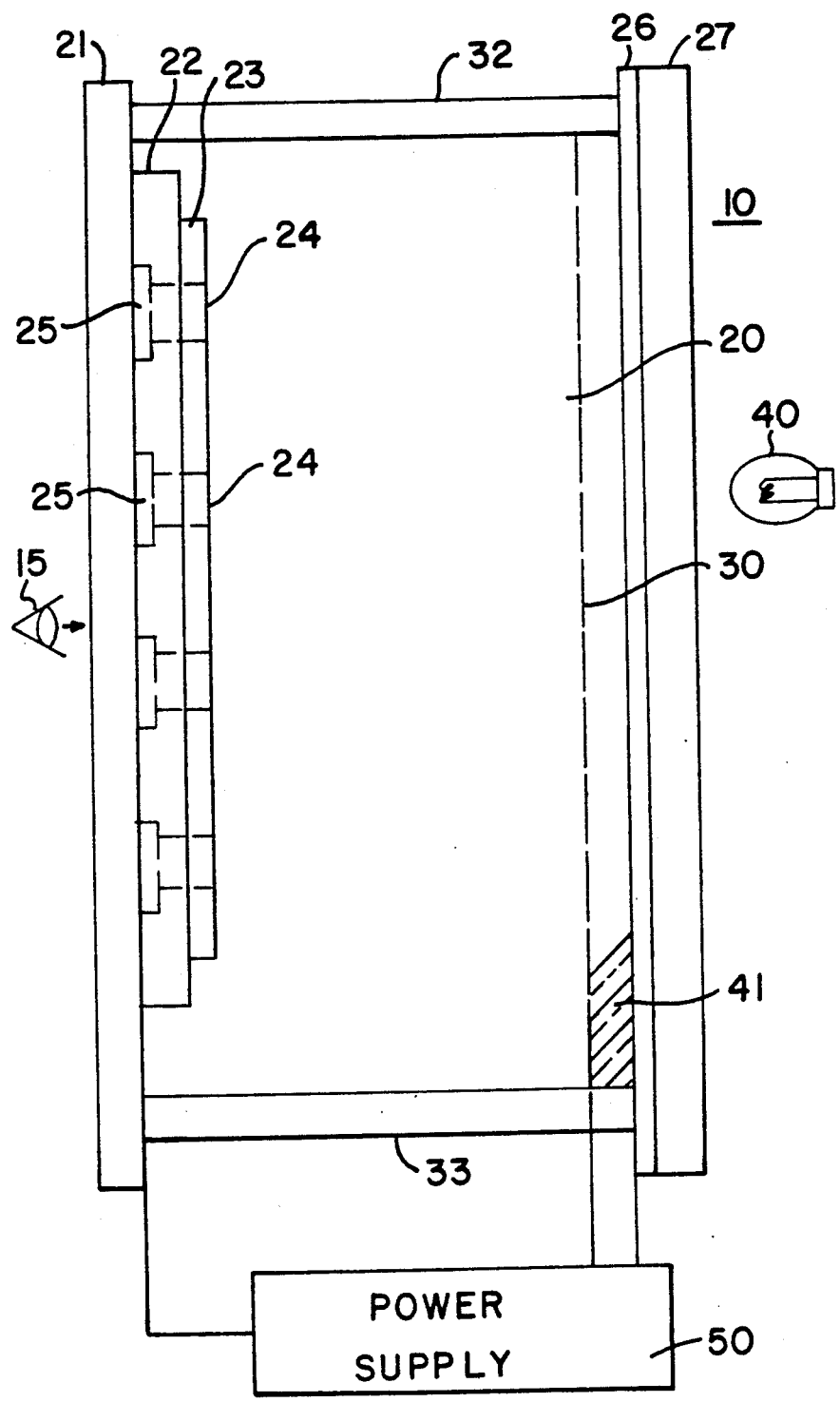
FIG. 1 is a partial plan view of an electrophoretic display apparatus according to this invention.

Referring to FIG. 1, there is shown a side view of a typical electrophoretic display 10.

The display 10 of FIG. 1 is filled with an electrophoretic solution or dispersion 20 which includes light colored pigment particles suspended in a dark dye solution. For examples of such solutions and techniques, reference is made to the above-cited U.S. Pat. No. 4,655,897.

As seen from FIG. 1, the display contains a front glass sheet or viewing surface 21. The eye of viewer 15 is shown viewing the front of the display via the glass sheet 21. Disposed upon the glass sheet 21 by suitable etching techniques are columns 23 and rows 25. The rows are made from an extremely thin layer of indium-tin-oxide (ITO) while the columns are made from thin layers of aluminum. These patterns are provided in extremely thin layers and essentially constitute an X Y matrix. The layers of ITO are relatively thin, being approximately 300 Angstroms in thickness. In any event, the grid or columns and the rows or cathodes are spaced from one another and insulated from one another by means of an insulating layer 22.

While the grids and cathodes have been specified in terms of rows and columns, it is immediately apparent that the terms can be interchanged as desired. In any event, each of the grid and cathode intersections are associated with a pigment well 24. These wells contain the electrophoretic solution which is in the cavity 20. The columns and rows are separated from a back electrode 26 or anode plate which is also fabricated on a sheet of glass 27 and constitutes a thin layer of ITO. The anode electrode is essentially an extremely thin planar layer of ITO deposited upon a sheet of glass, as can be seen in many of the above-cited references. The spacers such as 32 and 33 can be implemented in many different ways and essentially serve to mechanically separate the display cell or panel 10.

Shown positioned between the grid cathode structure and the anode 26 is a mesh electrode 30. The mesh electrode 30 is fabricated from a thin sheet of stainless steel having a plurality of apertures therein to create a mesh or screen like structure. The electrodes of the display are biased by means of the power supply 50. The supply 50 operates similar to that shown in the above cited patent U.S. Pat. No. 4,746,917. As indicated, the anode electrode 26 is a thin layer of ITO which is semi-transparent and highly reflective. The electrode 30 contains a plurality of apertures and due to the mesh like construction will allow light to pass via the apertures. The configuration described employs the anode 26 with the mesh like electrode 30. This configuration permits greater control of the pigment particles due to the various ratios of the potential applied to the electrode 30 as compared to that applied to the anode 27.

An extremely important aspect of the electrophoretic display which will enhance operation even further, is the possibility of back lighting the display. As seen in FIG. 1, there is shown a bulb 40 which appears at the back of the display while the viewer's eye 15 is at the front of the display. If the bulb is illuminated then the pattern, which is disposed upon the cathode surface, will stand out due to the fact that the light source 40 will tend to increase the contrast of the display. The electrophoretic solution can be illuminated by means of the light source as 40 thus creating greater contrast and enabling the display to be even clearer.

As one can understand, based on the fact that the display of FIG. 1 includes both the mesh electrode 30 and the anode electrode 27 some pigment stops at the mesh electrode and some pigment continues and stops at the anode electrode. Thus the amount of illumination from the back is somewhat attenuated. In order to avoid this, a display has been constructed which essentially eliminates the thin planar anode electrode. Thus the configuration of the display is as follows. Layers 26 and 27 are both glass or a single sheet of glass with the mesh electrode 30 deposited upon the glass sheet or positioned as shown in FIG. 1, thus entirely eliminating the planar anode electrode but substituting therefor a mesh electrode. Since all the pigment stops at the mesh anode 30 much more back lighting illumination passes through the cell via the mesh structure.

The configuration, as shown in FIG. 1, may be simply constructed using methods as taught by many of the references cited above. For example, a layer of insulating material is first coated on top of the ITO layer 27 which ITO layer is deposited upon the glass substrate 27. A layer of metal is then coated on the insulating material. This metal layer is patterned by a photolithographic technique to produce a mesh pattern. The insulating material is then plasma etched to produce the wells or apertures which therefore communicate between the mesh and the anode with the mesh being insulated from the anode by means of an insulating layer 41 as shown in FIG. 1.

In order to operate the display of FIG. 1, normal grid and cathode voltages are employed, as indicated and shown in the above references. The voltage employed on the mesh electrode or the mesh anode is a relatively high voltage designated as for example $+HV$ and this voltage is applied during the hold and write modes of the display. The electrode 26 designated as the anode, is connected to a voltage which is $+HV - _\Delta V$. The voltage $_\Delta V$ is selected to be between 5 and 10% less than the voltage $+HV$. Thus the mesh 30 is positive relative to the anode 27 and hence the pigment particles stop at the mesh permitting a maximum amount of illumination from the back lighting source 40. It is of course understood that if the anode 26 is completely eliminated, the mesh electrode 30 can be deposited directly on the glass sheet 27 by the above-described methods as should be obvious to those skilled in the art. In this manner a maximum amount of light will pass through the apertures created in the mesh.

In operation of the display the pigment particles contained in the electrophoretic solution 20 are brought forward towards the viewing surface in order to fill the wells formed between the rows and columns. Once a well such as well 24 is filled, the voltage on the rows, columns, and anode is then set such that the wells remain filled but pigment spaced between the rear cover and the columns are swept unto the mesh (30) and anode (26). The viewing side 21 is the color of the pigment in the wells.

By selectively applying voltages to the rows and columns, the pigment in individual wells 24 (at the intersection of the rows and columns selected) is forced out of the wells exposing the dye solution and making that intersection (pixel) dark. The removal of the pigment from the wells is not instantaneous but requires a period of time which depends upon the dimension of the cell or display, the fluid components, and the various applied voltages. The use of the mesh electrode 30 operates to more rapidly propel the pigment particles due to the increased field provided by the additional mesh electrode and hence affords a more rapid removal of particles from the wells. This is also due to the mesh like construction as the apertures in the mesh electrode enhance the field strength.

Figure 2:
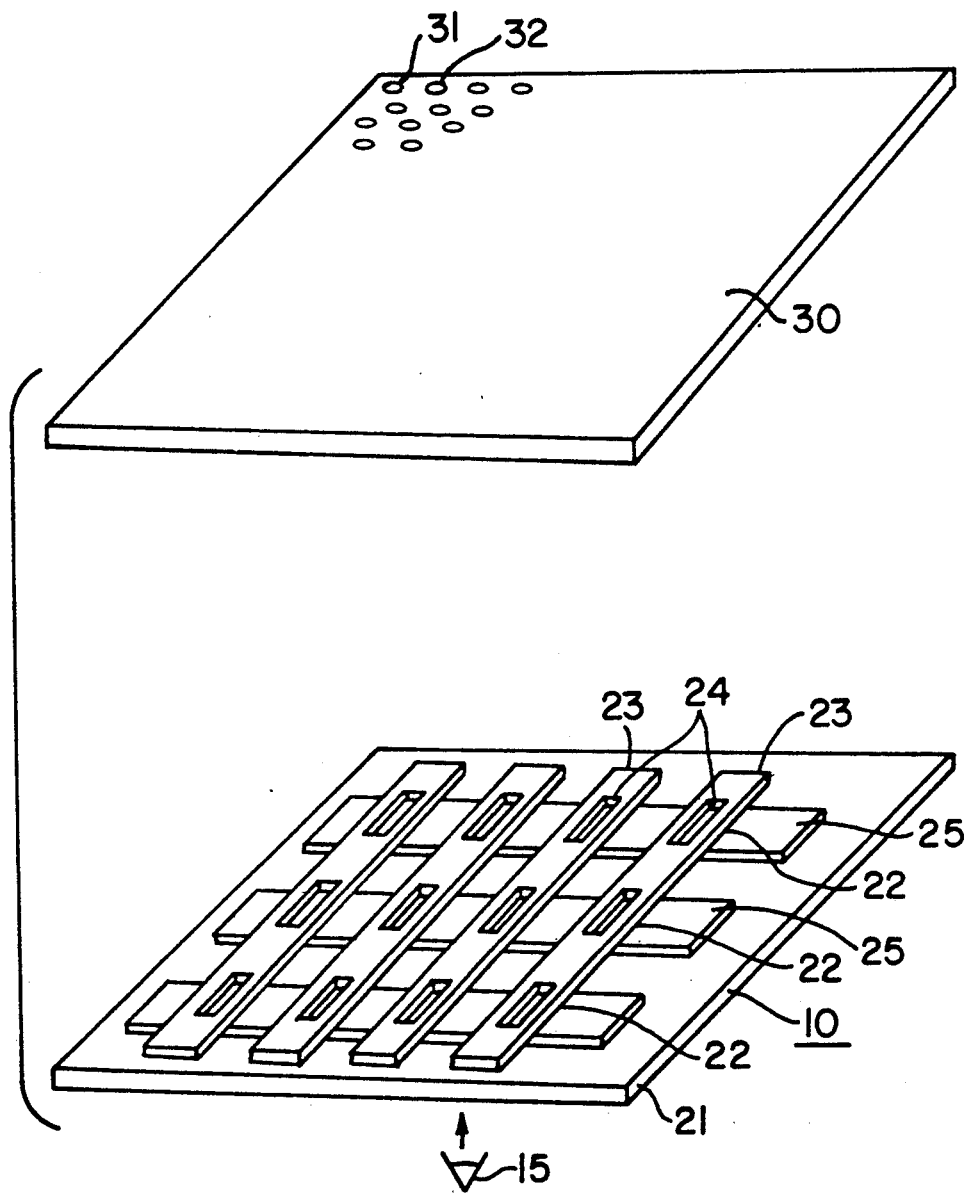
FIG. 2 is a plan view of an electrophoretic display showing certain aspects of the present invention.

Referring to FIG. 2, there is shown a planar plan view of an enlarged representation of an electrophoretic display cell or panel according to FIG. 1.

As seen in FIG. 2, each well 24 is accommodated between an intersection of a column which is insulatively separated from a row layer of ITO 25. The well 24 forms a pixel area which is indicative of an X Y intersection on the ITO display.

The pigment particles of course travel between the cathode and anode. As shown in FIG. 2, the anode may be the mesh-like structure 30 or may constitute a separate mesh structure fabricated directly on the layer of glass as above described or a stainless steel mesh 30 may be interposed between the anode and a cathode grid structure as indicated. As seen in FIG. 2, the mesh contains a plurality of apertures which are for example circular holes. It is immediately understood that the mesh may contain any shaped apertures, such as rectangular, square, triangular and so on. Essentially the apertures are extremely small. The mesh is a hardened stainless steel mesh available from many sources. Each aperture is between 10 to 30 mils in diameter with the space between apertures being of the same magnitude, namely 10 to 30 mils. Preferably the apertures are approximately 15 mils in diameter with the space between the apertures about 15 to 20 mils. Hence, as one can ascertain, due to the extremely large number of apertures and due to the spacing between apertures, the hardened stainless steel sheet appears as a total mesh-like structure which is integrally formed and highly conductive. Hence the same can act as an anode electrode or as an intermediate electrode to aid and assist in controlling the pigment particles.

As one can ascertain again from FIG. 1, due to the extremely transparent nature of the mesh-like structure, one can therefore direct light from a source 40 directly through the mesh when an additional ITO coated anode as 26 is not being employed. The above-noted mesh structure creates an electrophoretic display having superior operating characteristics over those provided in the prior art.

We claim:

1. In an electrophoratic display of the type having an XY matrix assembly consisting of a grid of vertical oriented lines intersected by a grid of horizontally oriented lines and isulated therefrom, with an anode electrode spaced from said matrix assembly and with an electrophoretic dispersion located between said anode and matrix assembly, the improvement therewith of a mesh like electrode structure located between said matrix assembly and said anode electrode, and adapted to be always biased at a greater positive potential than said anode electrode and said grid and cothode lines.

2. The electrophoretic display according to claim 1 wherein said mesh like electrode replaces the anode electrode of said display.

3. The electrophoretic display according to claim 1 wherein said anode electrode comprises a thin layer of ITO with said mesh like electrode located between said anode electrode and said matrix and operative when biased to further control electrophoretic particles.

4. The electrophoretic display according to claim 3 wherein said mesh like electrode is a planar sheet of a conductive material having a plurality of apertures on the surface to form a meshlike structure.

5. The electrophoretic display according to claim 4 wherein said conductive material is stainless steel.

6. The electrophoretic display according to claim 5 wherein said apertures are circular in shape, each having a diameter of between 10–30 mils and spaced one from the other between 10–30 mills.

7. The electrophoretic display according to claim 1 further including a light source located in proximately to said anode electrode to cause light to pass through said anode electrode to said matrix structure for illuminating said display.

8. The electrophoretic display according to claim 1 further including means for applying a higher positive potential to said mesh electrode than said anode electrode to cause pigment particles to migrate to and stop at said mesh electrode.

9. The electrophoretic display according to claim 1 wherein said anode electrode is deposited on a planar glass member.

10. The electrophoretic display according to claim 2 wherein said mesh electrode is deposited on a planar glass member.

11. A method of operating an electrophoretic display with improved particle control, comprising the steps of:
   placing a mesh electrode between the anode electrode and grid and cathode electrode structures;
   applying a bias to said mesh electrode of a more positive potential than that applied to said anode electrode to cause pigment particles to propagate to and stop at said mesh electrode.

12. The method according to claim 11 wherein said mesh electrode is a thin planar conductive sheet having a plurality of apertures formed therein to create a mesh like structure.

13. The method according to claim 12 wherein said aperture a are between 10–30 mils in diameter and spaced between 10–30 mils apart.

14. In an electrophoretic display of the type having an X-Y matrix of intersecting cathode and grid lines and an anode electrode separated from said matrix, with an electrophoretic dispersion located between said anode electrode and said matrix, the improvement comprising:
   an anode electrode being a mesh like structure having a plurality of closely spaced apertures located on the surface thereof and adapted to receive an operating potential to cause pigment particles to migrate to said mesh during display operation, said mesh electrodes always biased more positive than any of said grid cathode lines and anode electrode.

15. The apparatus according to claim 14 wherein said anode electrode is a conductive mesh like structure deposited upon a glass layer and separated therefrom by an insulator mesh layer.

16. The apparatus according to claim 15 wherein said mesh like structure is a planar sheet of stainless steel having a plurality of closely spaced apertures on the surface thereof.

17. The apparatus according to claim 14 further including a second anode electrode insulated from said mesh like structure and said second anode electrode being a thin layer of a conductive material deposited on a layer of glass.

18. The apparatus according to claim 17 wherein said thin layer of conductive material is ITO.

19. The apparatus according to claim 16 wherein said apertures as distributed over the entire surface of said sheet are between 10-30 mils in diameter and separated one from the other by between 10-30 mills.

20. The apparatus according to claim 19 wherein said apertures are circular in shape.

* * * * *